United States Patent
Imamura et al.

(10) Patent No.: US 6,704,853 B1
(45) Date of Patent: Mar. 9, 2004

(54) DIGITAL SIGNAL PROCESSING APPARATUS AND METHOD FOR CONTROLLING THE SAME

(75) Inventors: Yasushi Imamura, Niihama (JP); Takao Inoue, Saijo (JP); Takahiro Watanabe, Ehime (JP)

(73) Assignee: Matsushita Electric Industrial Co., Ltd. (JP)

( * ) Notice: Subject to any disclaimer, the term of this patent is extended or adjusted under 35 U.S.C. 154(b) by 518 days.

(21) Appl. No.: 09/806,310
(22) PCT Filed: Aug. 30, 2000
(86) PCT No.: PCT/JP00/05900
§ 371 (c)(1),
(2), (4) Date: May 16, 2001
(87) PCT Pub. No.: WO01/16712
PCT Pub. Date: Mar. 8, 2001

(30) Foreign Application Priority Data

Aug. 31, 1999 (JP) .............................. 11-244158

(51) Int. Cl.[7] ................................................ G06F 9/38
(52) U.S. Cl. ........................................ 712/35; 709/216
(58) Field of Search ................. 712/11, 35, 6; 709/216, 213

(56) References Cited

U.S. PATENT DOCUMENTS

| | | | | | |
|---|---|---|---|---|---|
| 3,875,391 | A | * | 4/1975 | Shapiro et al. | 708/521 |
| 3,932,845 | A | * | 1/1976 | Beriot | 712/214 |
| 4,298,936 | A | * | 11/1981 | Shapiro | 712/11 |
| 6,154,829 | A | * | 11/2000 | Mino et al. | 712/35 |
| 6,166,988 | A | * | 12/2000 | Ryu et al. | 365/230.08 |
| 6,532,530 | B1 | * | 3/2003 | Kim et al. | 712/35 |

FOREIGN PATENT DOCUMENTS

| | | |
|---|---|---|
| JP | 2-224516 | 9/1990 |
| JP | 3-36628 | 2/1991 |
| JP | 4-218834 | 8/1992 |
| JP | 8-137661 | 5/1996 |

* cited by examiner

Primary Examiner—Eric Coleman
(74) Attorney, Agent, or Firm—Parkhurst & Wendel, L.L.P.

(57) ABSTRACT

The present invention provides a digital signal processing apparatus and a method for controlling the apparatus that allow for a reduction of circuit size to minimize an increase in power consumption and the costs of circuitry and an improvement in signal processing speed. To achieve this, the present invention eliminates a circuit arrangement that was conventionally required for executing a compare instruction, conditional jump instruction, and jump instruction, by adding a relatively small-sized circuit such as an encoder 51 for processing an external signal 10 and a capability of decoding a condition determination data select instruction.

4 Claims, 7 Drawing Sheets

DIGITAL SIGNAL PROCESSING APPARATUS AND METHOD FOR CONTROLLING THE SAME

TECHNICAL FIELD

The present invention relates to a digital signal processing apparatus and a method for controlling the apparatus that allow for a fast operation in system control.

BACKGROUND ART

Generally in the field of system control such as servo control, efforts are made to minimize an error between an actual output and an expected target value provided from a device to be controlled. In recent years, a, digital signal processor (hereinafter abbreviated to DSP) has been widely used, which accepts such an error as a digital value and performs operations on the digital value to generate an optimal manipulated variable for the device to be controlled.

Operations in some DSPs are implemented by hardware tailored to a particular use. However, many DSPs have a configuration in which the operations are controlled by a program. The DPS, like a microprocessor, performs processing according to a given program and is characterized by more sophisticated operations at higher speed than the microprocessor.

FIG. 5 shows an internal configuration of a conventional DSP. In FIG. 5, a program counter 2, in which any value can be set through an external bus 1, generates a read address of program memory 3 when a process by the DSP is activated. When a jump instruction is detected in an instruction decoder 4, the jump address is set in the program counter 2. Otherwise, the counter is incremented by one in synchronization with a system clock.

A program is written into the program memory 3 through the external bus 1 and a program word at the address output by the program counter 2 is output from the program memory 3.

When a process by the DSP is activated, the instruction decoder 4 interprets the program word provided from the program memory 3 and generates a control signal 9 for controlling internal components, a data memory store address provided to a delay unit 8, and a data memory read address for reading data X, Y to be input into an arithmetic and logic unit 6 from a data memory 5.

The control signal 9 is a signal for controlling the arithmetic and logic unit 6, data memory 5, and delay unit 8 in the DSP.

The delay unit 8 temporarily holds the data memory store address generated by the instruction decoder 4 and transfers it to the data memory 5 after a wait for a predetermined period of time.

The predetermined time period represents delay time until the arithmetic and logic unit 6 outputs resultant data of an operation specified by an instruction.

The data memory 5 is configured so as to be capable of storing data provided through the external bus 1 and has the capability of outputting data to the arithmetic and logic unit 6 according to the data memory read address and the capability of storing data output by the arithmetic and logic unit 6 according to the data memory store address provided from the delay unit 8.

The arithmetic and logic unit 6 has arithmetic capabilities for supporting operation instructions in a program stored in the program memory 3.

A MUX 7b selects the result of an operation performed by the arithmetic and logic unit 6 to transfer it to the data memory 5 when the result of the operation is written into the data memory 5 after the instruction decoder 4 detects an operation instruction, or selects an external status signal 10 to transfer it to the data memory 5 when the external status signal 10 is written into the data memory 5 after the instruction decoder 4 detects an external input instruction.

FIG. 6 shows an example of a process that requires time for processing other than operations in servo control processing. In FIG. 6, an error 11 is a difference between an actual output and an expected output from a device to be controlled. A manipulated variable 13 is information for operating the controlled device.

Because the error 11 is input into process A in certain cycles, the time for generating the manipulated variable 13 based on the error 11 is limited. The following process should be performed within the limited time.

First, in process A, an operation is performed based on the error 11 and one of the result of the operation and a value of variable 1 (Z1) is selected by a selection unit 12 and provided to process B.

Process B performs an operation based on the value selected by the selection unit 12, stores the intermediate result of the process 1 based on the result of the operation into variable 1 (Z1), and outputs the final result of the process 1 as a manipulated variable 13. Z1 input into the selection unit 12 is a value on which an operation was performed and stored in variable 1 by process 1 a cycle before.

The manipulated variable 13 calculated in the above-described method is used for driving the device to be controlled in such a way that the manipulated variable 13 is read through the external bus 1 and input into an output circuit such as a digital-analog converter, for example.

In the above-describe example, it is assumed that the external status signal 10 shown in FIG. 5 is a one-bit signal and that the output from process A is selected by the selection unit 12 shown in FIG. 6 if the external signal 10 is 0, or Z1 is selected by the selection unit 12 shown in FIG. 6 if the external status signal 10 is 1.

FIG. 7 shows part of a program flow in the case where the exemplary process shown in FIG. 6 is processed by the DSP shown in FIG. 5. The program flow, "process A→21→22→23→24→25→26→process B", in FIG. 7 embodies the flow, "process A→selection unit 12→process B" shown in FIG. 6 and each of the instructions is transferred from the program memory 3 to the instruction decoder 4.

First, an external status signal 10 is stored at address K of the data memory 5 by the execution of the external input instruction 21. Then, the value at address K of the data memory 5 and a comparison value in an operand in the compare instruction 22 are transferred from the data memory 5 to the arithmetic and logic unit 6, where these values are compared. If they match, an address value existing in the data transfer instruction 26 is set in the program counter 2 by the execution of the conditional jump instruction 23, and then an output value process A is stored at address T of the data memory 5 by the execution of the data transfer instruction 26.

If the values do not match in the comparison process by the compare instruction 22, the program counter 2 is implemented by one, a value in variable 1 (Z1) is stored at address T of the data memory 5, an address value existing in process B is set in the program counter 2 by the execution of the jump instruction 25, then control is passed to process B.

In process B, an operation is performed based on the value stored at address T of the data memory 5. Thus, an input to process B is selected from one of the output value process A and variable Z1 according to the value of the external status signal 10. In this example, the longest path of the process by the selection unit 12 is "21→22→23→24→25" and the process requires at least five system clock cycles.

Furthermore, in this example, one value is selected out of the two values. If a value were to be selected out of N values, the number of instructions 27 in FIG. 7 would increase by N−2, increasing in the required amount of the program memory 3 and increasing the minimum time for processing by the selection unit 12 by 5×(N−2) system clock cycles. This overhead may cause shortage of time assigned to control process to be performed essentially.

However, a conventional DSP as described above takes time for the process of selecting a variable based on information provided externally in program processing and requires an increased amount of programs, increasing the required amount of program memory 3.

These problems inhibit an increase in processing speed and in addition, entails an increase in the size of LSI chips in developing the system LSIs containing the DSP, increasing power consumption and chip costs.

DISCLOSURE OF INVENTION

The present invention solves the above-mentioned problems and provides a digital signal processing apparatus and its control method, that allow for a reduction of circuit size to minimize an increase in power consumption and the costs of circuitry and an improvement in signal processing speed.

To solve the problems, the digital signal processing apparatus and its control method adds relatively small-sized circuits such as means for processing an external status signal or means for selecting condition determination data and a condition determination data selecting instruction decode capability.

That is, a digital signal processing apparatus according to claim 1 of the present invention is configured so as to comprise a program memory for storing a program, a program counter for reading an instruction from said program memory, an instruction decoder unit for outputting a control signal and an address according to the instruction read from said program memory, a delay unit for delaying the address output from said instruction decoder, data memory for outputting data based on the address output from said instruction decoder unit and storing data based on the address output from said delay unit, and an arithmetic and logic unit for performing an operation based on the data output from said data memory and transferring the result of the operation to said data memory, said apparatus being characterized by having external signal processing means for processing an external signal and means for selecting one of an output generated by said means and an output from said arithmetic and logic unit to store the selected output in said data memory.

A digital signal processing apparatus controlling method according to claim 2 is an method for controlling the digital in claim 1, comprising the steps of reading an external input instruction from the program memory according to an address generated by the program counter, decoding said external instruction and issuing an operation control signal, storing data processed by the external signal processing means according to said operation control signal, reading a multiply instruction from said program memory according to the address generated by said program counter, decoding said multiply instruction and issuing an operation control signal, multiplying data memory variable 1 available to be selected by said processed data according to said operation control signal and storing a result of the multiplication in said data memory, executing said multiply instruction to multiply data memory variable 2 available to be selected by said processed data and storing a result of the multiplication in said data memory, and executing an add instruction on said variable 1 and variable 2 and storing a result of the addition in said data memory as a result of selecting the external signal as a condition for determination.

A digital signal processing apparatus according to claim 3 is configured so as to comprise program memory for storing a program, a program counter for reading an instruction from said program memory, an instruction decoder unit for outputting a control signal and an address according to the instruction read from said program memory, a delay unit for delaying the address output from said instruction decoder, data memory for outputting data based on the address output from said instruction decoder unit and storing data based on the address output from said delay unit, and an arithmetic and logic unit for performing an operation based on the data output from said data memory and transferring the result of the operation to said data memory, said apparatus being characterized by having data selection means for determining a condition by using an external signal as information for the determination, and means having a condition determination data select instruction capability for causing said data selection means to be executed.

A digital signal processing apparatus controlling method according to claim 4 is an method for controlling the digital in claim 3, comprising the steps of reading the condition determination data select instruction from the program memory according to the address generated by the program counter, decoding said condition determination data selection instruction and issuing an operation control signal, reading data available to be selected by the data selection means from the data memory according to said operation control signal, transferring the data selected by said data selection means according to an external signal to said data memory, and storing said selected data in said data memory according to an address from the delay unit.

According to the configuration and method, the circuit arrangements and the amount of program memory that were conventionally required for executing a compare instruction, conditional jump instruction, and jump instruction can be reduced by adding relatively small-sized circuits such as means for processing an external status signal or means for selecting condition determination data and a condition determination data selection instruction selecting instruction decode capability.

In addition, data selection processing time required per control processing interval is reduced to increase the quantity of operation instructions essential to the control.

Thus, circuit size can be reduced to minimize an increase in power consumption and costs and signal processing speed can be improved.

When a control process is changed based on an external status during the execution of a program, the above-mentioned effects become remarkable especially as the number of external statuses, which are discrimination conditions for changing the control process, is increased.

BEST MODE FOR CARRYING OUT THE INVENTION

The digital signal processing apparatus and a method for controlling the apparatus according to one embodiment of the present invention will be described below in detail with reference to the drawings.

Embodiment 1

A digital signal processing apparatus and its control method according to embodiment 1 of the present invention will be described.

Figure 1:
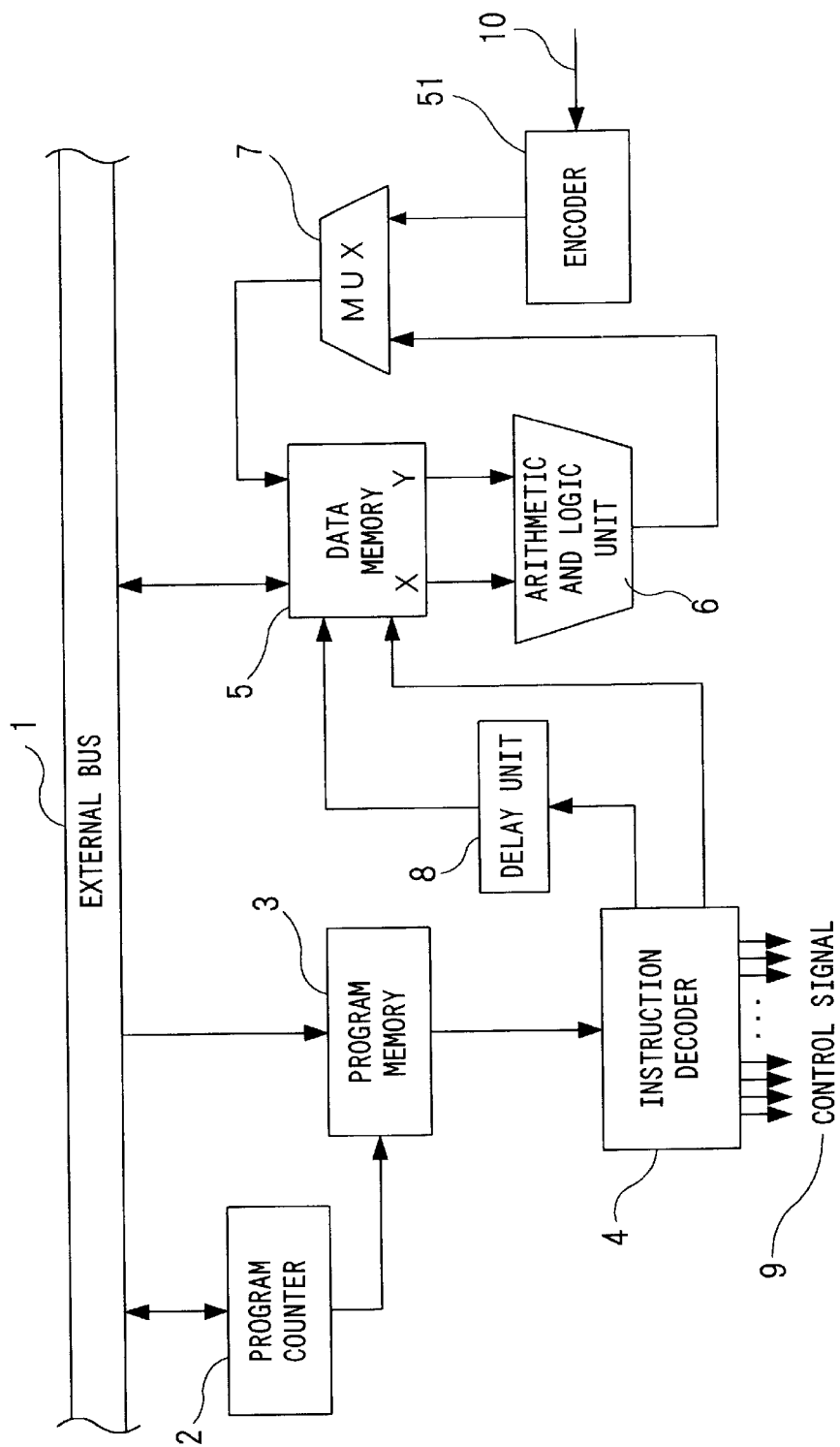
FIG. 1b is a block diagram of a configuration of a digital signal processing apparatus according to Embodiment 1 of the present invention.
Figure 5:
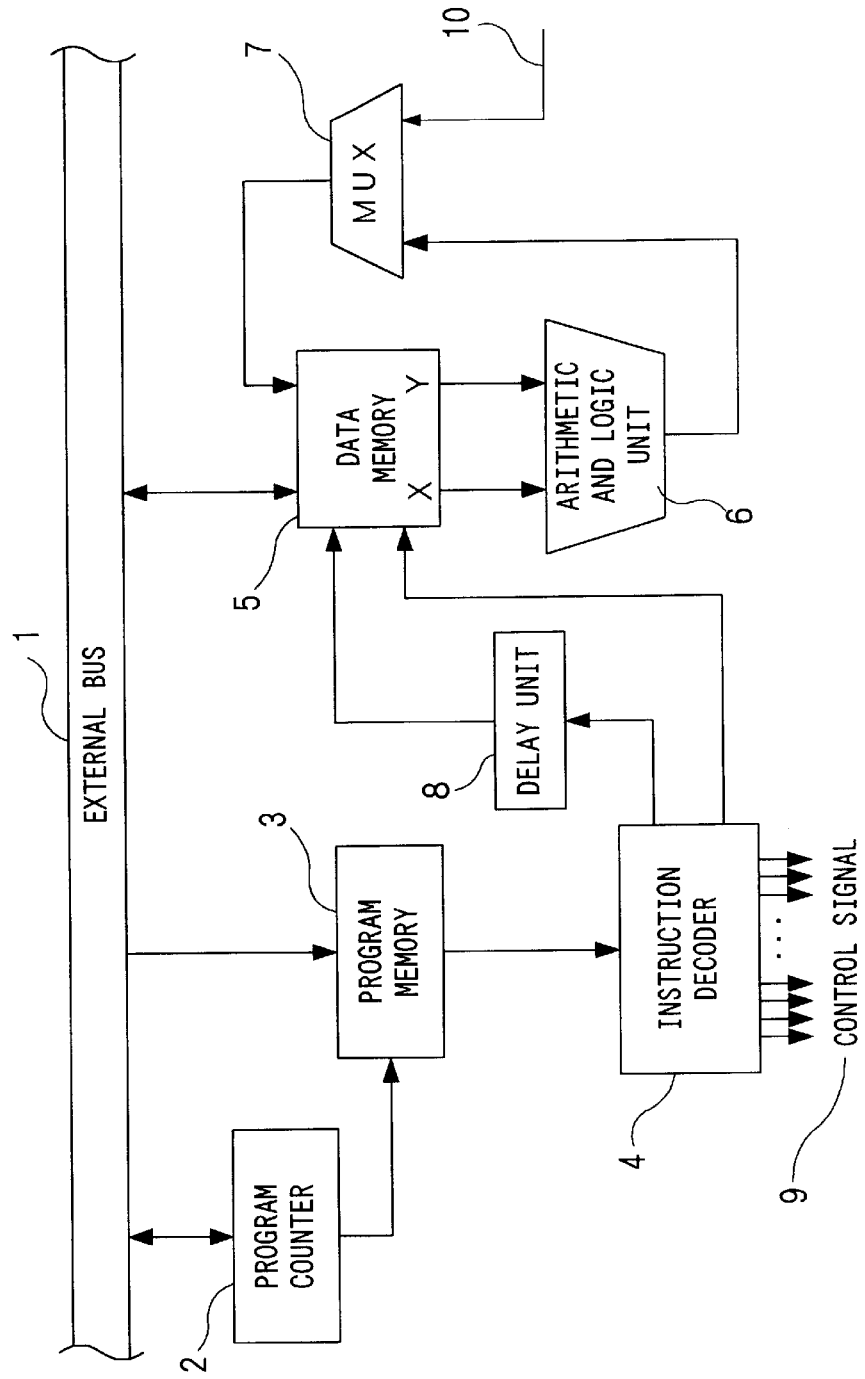
FIG. 5 is a block diagram of a configuration of a digital signal processing apparatus according to a prior art.

FIG. 1 is a block diagram showing a configuration of the digital signal processing apparatus according to embodiment 1 of the present invention. In FIG. 1, the functions of an, external bus 1, program counter 2, program memory 3, data memory 5, MUX 7, delay unit 8, and control signal 9 are the same as those of the prior-art DSP shown in FIG. 5. An instruction decoder 4 has prior-art decoding functions from which the function of interpreting a compare instruction, conditional jump instruction, and jump instruction is eliminated. Therefore, the arithmetic and logic unit 6 has prior-art operation functions from which a comparison operation function is eliminated.

Because the conditional jump instruction and jump instruction are eliminated, a system for writing addresses from the instruction decoder 4 into the program counter 2 is eliminated.

An encoder 51 accepts an external status signal 10 as its input, performs a predetermined process on it, and transfers it to the MUX 7.

One example of the operation of the encoder 51 will be described. It is assumed that the external status signal 10 is one-bit signal and that an output from process A is selected in the selection unit 12 in FIG. 6 if the external status signal 10 is 0, or Z1 is selected in the selection unit 12 in FIG. 6 if the external status signal is 1. The encoder 51 has the capability of outputting a one-word value, "0x0100", if the external status signal 10 is 0 and outputting a one-work value, "0x0001", if the external status signal 10 is 1.

Here, "0x" given above represents that the value is a hexadecimal in C language, therefore "0x0100" and "0x0001" represent "0100" and "0001" in hexadecimal, respectively.

Figure 2:
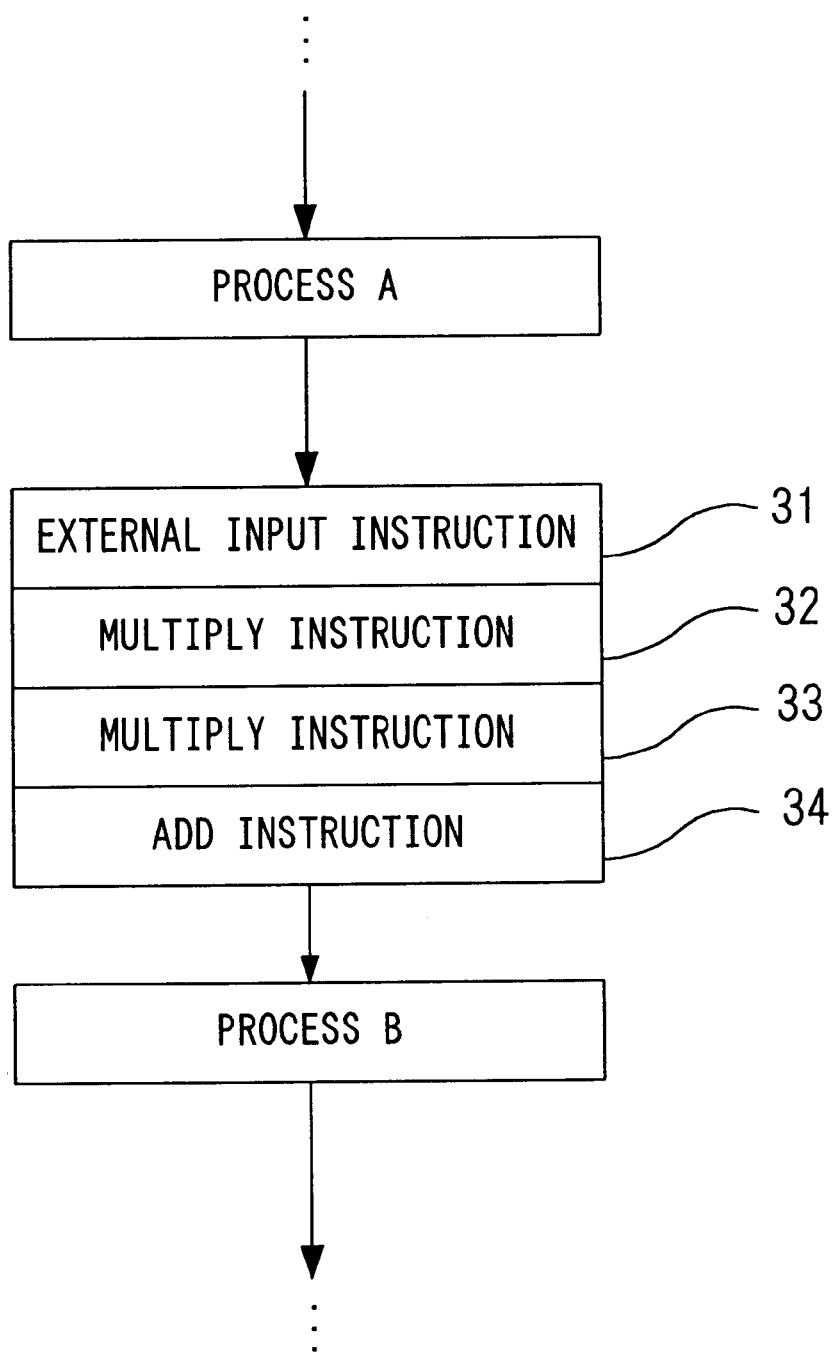
FIG. 2 is a program flow relating to a data selection process according to the Embodiment 1.
Figure 6:
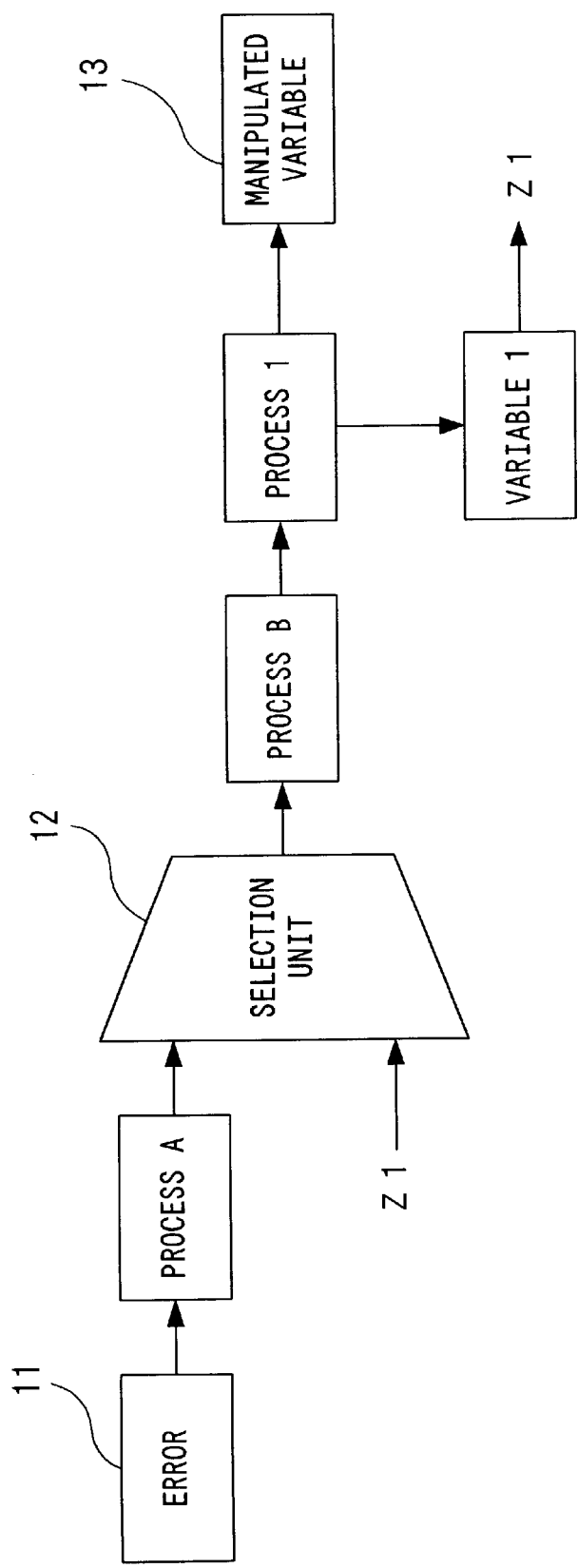
FIG. 6 is an example of a processing form that requires time for processing other than calculations in system control processing for a servo system according to the prior art.
Figure 7:
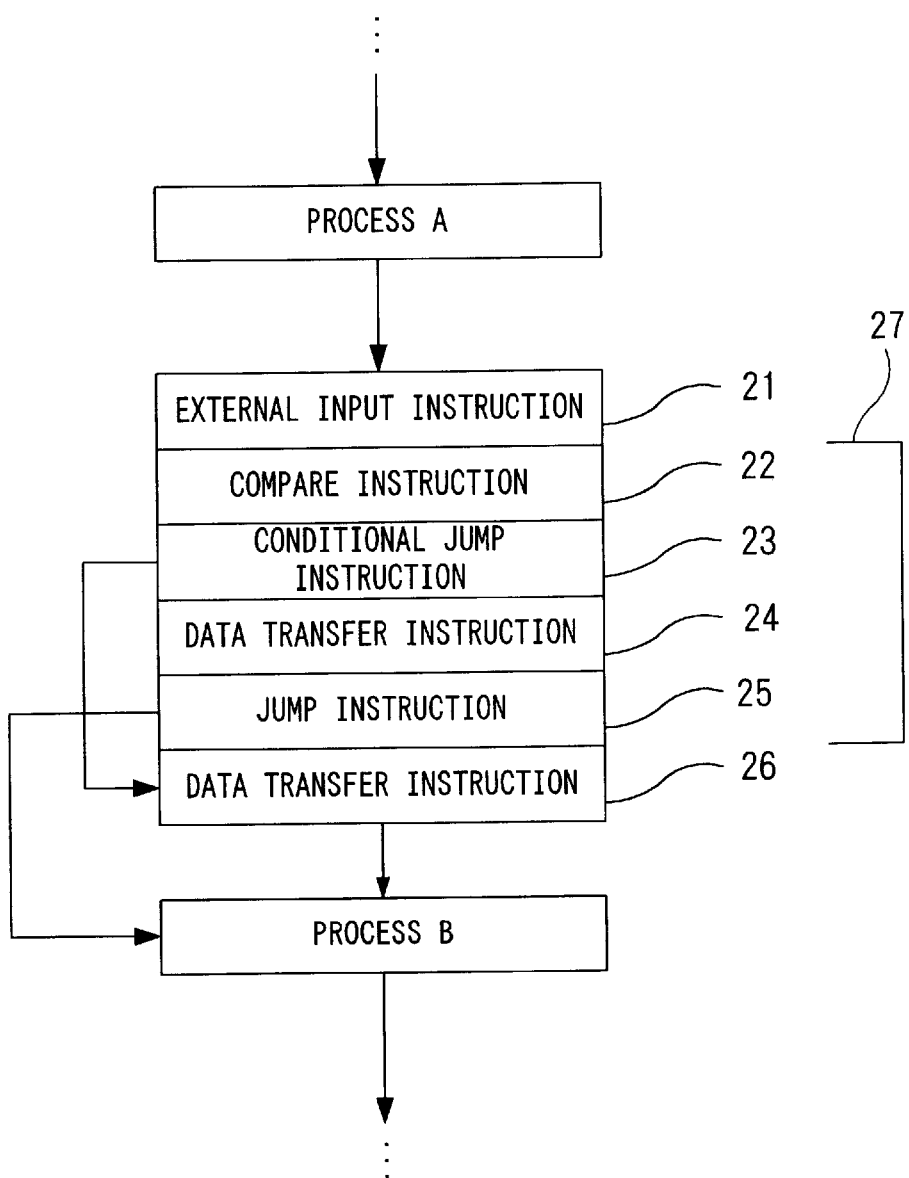
FIG. 7 is a program flow relating to a data selection process in the example according to the prior art.

FIG. 2 shows part of a program flow of the exemplary process shown in FIG. 6 in the case where it is processed by the DSP shown in FIG. 1. The program flow, "process A→31→32→33→34→process B", shown in FIG. 2 embodies the flow, "process A→selection unit 12→process B", shown in FIG. 6. Each of the instructions is transferred from the program memory 3 to the instruction decoder 4. It is assumed that an output from process A and variable 1 have already been stored in the data memory 5.

First, a signal ("0x0100" or "0x0001" provided above), which is the external status signal 10 processed by the encoder 51, is stored at address K of the data memory 5 by the execution of the external input instruction 31 shown in FIG. 2.

Then, by the execution of multiply instruction 32, the value at address K of the data memory 5 and the output value process A are transferred from the data memory 5 to the arithmetic and logic unit 6, where a multiplication, the process A output value x the high-order byte of the value at address K, is performed, then the result is stored in the data memory at address G1. Then, by the execution of a multiply instruction 33, the value at address K and the value of variable 1 (Z1) are transferred from the data memory 5 to the arithmetic and logic unit 6, z1 is multiplied by low-order byte of the value at address K, and the result is stored in the data memory 5 at address G2. The high-order byte mentioned above is "01" and the low-order byte is "00" if the value at address K is "0x0100", for example.

The above-described process will be described in detail. If the external status signal 10 is 0, then "0x0100" is stored at address K of the data memory 5 by the encoder 51, as described above. In that case, the multiplication, the output value process A x the high-order byte of the value at address K, is the process A output value×0x01, and, as a result, the output value process A is stored at address G1 of the data memory 5. The multiplication, Z1×low-order byte of the value at address K is Z1×0x00, and "0x0000" is stored at address G2.

Next, the result of an addition, data at address G1+data at address G2, is stored in address T of the data memory 5 by the execution of an add instruction 34. In the example described above, data at address G1+data at address G2 represents the process A output value+0x0000, therefore the result, the process An output value, is stored at address T of the data memory 5. On the contrary, if 0x00001 was stored at address K of the data memory 5 by the encoder 51, variable Z1 would be stored. That is, the process A output value or variable Z1 is selected as the input into process B, depending on the external state signal 10.

In process B, an operation is performed on the value stored at address T. Here, the processing in the selection unit 12 always passes through the path, "31→32→33→34", and therefore takes four system clock cycles.

While the value is selected from the two values in this example, the value may be selected from N values and even in such a case only one external input instruction, N multiply instructions, and N−1 add instructions shown in FIG. 2 are needed to be performed. Therefore, the required amount of program memory 3 can be reduced and the minimum time for the processing by the selection unit 12 shown in FIG. 6 is as short as 1+N+(N−1)=2N system clock cycles.

Embodiment 2

A digital signal processing apparatus and its control method according to embodiment 2 of the present invention will be described.

Figure 3:
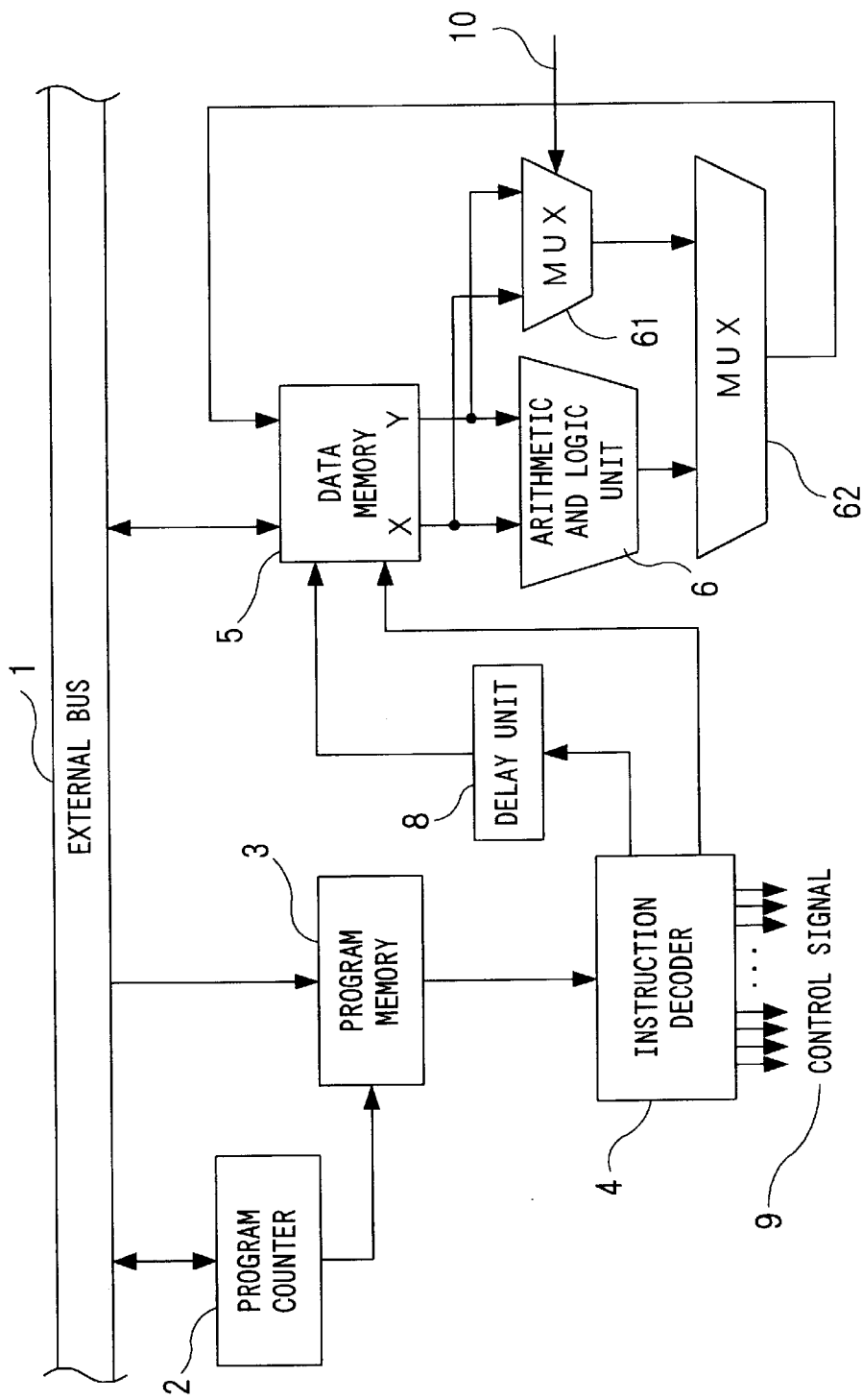
FIG. 3 is a block diagram of a digital signal processing apparatus according to Embodiment 2 of the present invention.
Figure 4:
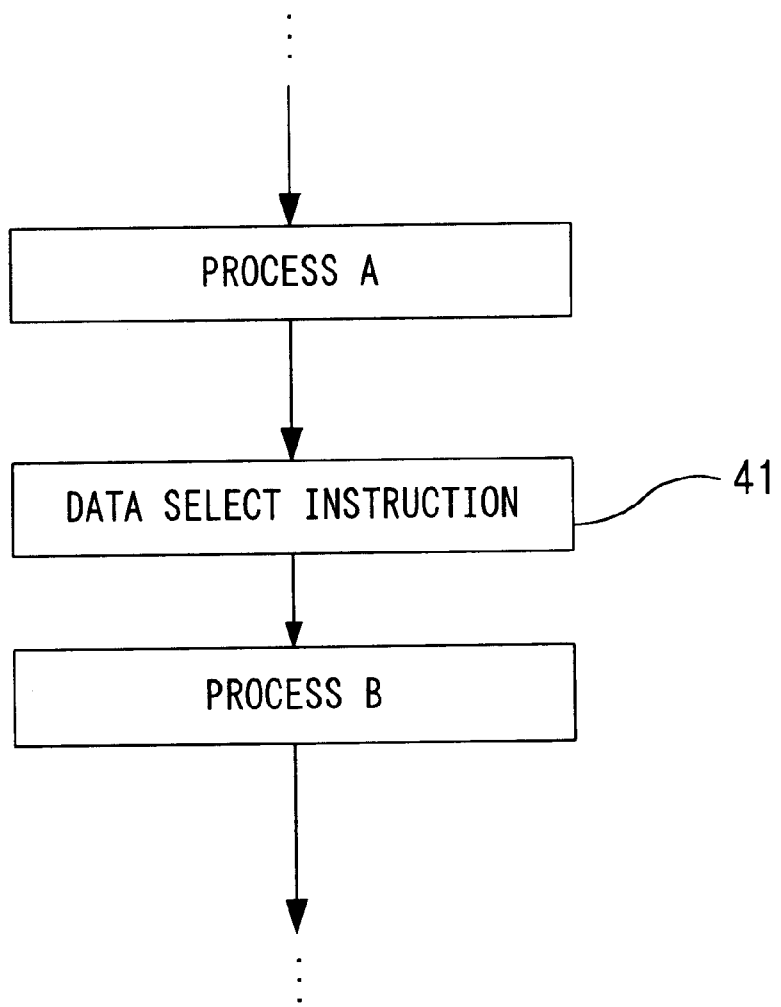
FIG. 4 is a program flow relating to a data selection process according to the Embodiment 2.

FIG. 3 is a block diagram of the digital signal processing apparatus according to embodiment 2 of the present invention. In FIG. 3, the functions of an external bus 1, program counter 2, program memory 3, data memory 5, delay unit 8, and control signal 9 are the same as those of the prior-art DSP shown in FIG. 5. An instruction decoder 4 has prior-art decoding functions from which the function of interpreting a compare instruction, conditional jump instruction, and jump instruction is eliminated and to which the function of interpreting a data select instruction 41 shown in FIG. 4 is added. Therefore, the arithmetic and logic unit 6 has prior-art operation functions from which a comparison operation function is eliminated. Because the conditional jump instruction and jump instruction are eliminated, a conventional system for writing addresses from the instruction decoder 4 into the program counter 2 is eliminated.

When the data select instruction 41 shown in FIG. 4 is executed, a MUX 61 selects output X of the data memory if an external status signal 10 is 0, or selects output Y of the data memory if the external status signal 10 is 1. A MUX 62 selects the output of the MUX 61 if the instruction executed is a data select instruction or selects the output of an arithmetic and logic unit 6 if the instruction executed is an instruction other than a data select instruction. That is, for the output from the MUX 62, output X or Y of the data memory is selected depending on the external signal 10 if the instruction executed is a data select instruction, or the result of an operation performed by the arithmetic and logic unit 6 on outputs X and Y in the data memory is selected if the instruction executed is an instruction other than the data select instruction.

The delay unit 8 temporarily holds a data memory store address generate by the instruction decoder 4 and transfers it to the data memory 5 after a predetermined wait time, as with the example of the prior art described earlier.

FIG. 4 shows part of a program flow of the exemplary process shown in FIG. 6 in the case where it is processed by the DSP shown in FIG. 3. The program flow, "process A→41 →process B", shown in FIG. 4 embodies the flow, "process A→selection unit 12 process B", shown in FIG. 6. Each of the instructions is transferred from the program memory 3 to the instruction decoder 4. It is assumed that an output from process A and variable 1 have already been stored in the data memory 5.

First, the output value process A is output from port X of the data memory 5 and the value of variable 1 (Z1) is output from port Y, either of the values is selected in the MUX 61 according to the value-of the external status signal 10, the selected value is selected by the MUX 62 and stored at address T of the data memory 5. In process B, an operation is performed based on the value stored at address T.

That is, the process A output value or variable Z1 is selected for the input into process B according to the value of the external status signal 10. Here, the process by the selection unit 12 always passes through only "41" and therefore takes one system clock cycle.

While the value is selected from the two values in this example, the value may be selected from N values, and even in such a case only N−1 data select instructions are needed to be executed. Therefore, the required amount of program memory 3 can be reduced and the minimum processing time of the selection unit 12 is as short as N−1 system clock cycles.

What is claimed is:

1. A digital signal processing apparatus, comprising a program memory for storing a program, a program counter for reading an instruction from said program memory, an instruction decoder unit for outputting a control signal and an address according to the instruction read from said program memory, a delay unit for delaying the address output from said instruction decoder, data memory for outputting data based on the address output from said instruction decoder unit and storing data based on the address output from said delay unit, and an arithmetic and logic unit for performing an operation based on the data output from said data memory and transferring the result of the operation to said data memory, said apparatus being characterized by having:

external signal processing means for processing an external signal and means for selecting one of an output generated by said means and an output from said arithmetic and logic unit to store the selected output in said data memory.

2. The control method for controlling the digital signal processing apparatus according to claim 1, comprising the steps of:

reading an external input instruction from the program memory according to an address generated by the program counter;

decoding said external instruction and issuing an operation control signal;

storing data processed by the external signal processing means according to said operation control signal;

reading a multiply instruction from said program memory according to the address generated by said program counter;

decoding said multiply instruction and issuing an operation control signal;

multiplying data memory variable 1 available to be selected by said processed data according to said operation control signal and storing a result of the multiplication in said data memory;

executing said multiply instruction to multiply data memory variable 2 available to be selected by said processed data and storing a result of the multiplication in said data memory; and executing an add instruction on said variable 1 and variable 2 and storing a result of the addition in said data memory as a result of selecting the external signal as a condition for determination.

3. A digital signal processing apparatus, comprising a program memory for storing a program, a program counter for reading an instruction from said program memory, an instruction decoder unit for outputting a control signal and an address according to the instruction read from said program memory, a delay unit for delaying the address output from said instruction decoder, data memory for outputting data based on the address output from said instruction decoder unit and storing data based on the address output from said delay unit, and an arithmetic and logic unit for performing an operation based on the data output from said data memory and transferring the result of the operation to said data memory, said apparatus being characterized by having:

data selection means for determining a condition by using an external signal as information for the determination; and means having a condition determination data select instruction capability for causing said data selection means to be executed.

4. The method for controlling the digital signal processing apparatus according to claim 3, comprising the steps of:

reading the condition determination data select instruction from the program memory according to the address generated by the program counter;

decoding said condition determination data selection instruction and issuing an operation control signal;

reading data available to be selected by the data selection means from the data memory according to said operation control signal;

transferring the data selected by said data selection means according to an external signal to said data memory; and storing said selected data in said data memory according said delay unit.

* * * * *

UNITED STATES PATENT AND TRADEMARK OFFICE
CERTIFICATE OF CORRECTION

PATENT NO. : 6,704,853 B1
DATED : March 9, 2004
INVENTOR(S) : Yasushi Imamura et al.

It is certified that error appears in the above-identified patent and that said Letters Patent is hereby corrected as shown below:

Title page,
Item [86], § 371(c)(1)(2), (4) Date: change "May 16, 2001" to -- March 29, 2001 --.

Signed and Sealed this

Twenty-second Day of June, 2004

JON W. DUDAS
*Acting Director of the United States Patent and Trademark Office*